(12) United States Patent
Fariello et al.

(10) Patent No.: US 8,753,142 B2
(45) Date of Patent: Jun. 17, 2014

(54) METHODS OF CONVERTING PATCHING SYSTEM TO INTELLIGENT PATCHING SYSTEM AND RELATED SHELF UNITS

(75) Inventors: Patrick Fariello, Murphy, TX (US); Gil Ruiz, McKinney, TX (US)

(73) Assignee: CommScope, Inc. of North Carolina, Hickory, NC (US)

( * ) Notice: Subject to any disclaimer, the term of this patent is extended or adjusted under 35 U.S.C. 154(b) by 1139 days.

(21) Appl. No.: 12/718,255

(22) Filed: Mar. 5, 2010

(65) Prior Publication Data
US 2010/0224578 A1 Sep. 9, 2010

Related U.S. Application Data

(60) Provisional application No. 61/158,500, filed on Mar. 9, 2009.

(51) Int. Cl.
G02B 6/00 (2006.01)
(52) U.S. Cl.
USPC .......................................... 439/489; 385/135
(58) Field of Classification Search
USPC ............. 211/26, 175; 439/489–491; 385/135; 29/401.1
See application file for complete search history.

(56) References Cited

U.S. PATENT DOCUMENTS

| 4,662,690 | A |  | 5/1987 | Genereaux |
| RE32,816 | E |  | 1/1989 | Plank |
| 4,836,624 | A |  | 6/1989 | Schwickrath |
| 5,129,030 | A |  | 7/1992 | Petrunia et al. |
| 5,412,751 | A | * | 5/1995 | Siemon et al. ................. 385/135 |
| 5,442,725 | A |  | 8/1995 | Peng |
| 5,460,441 | A |  | 10/1995 | Hastings et al. |
| 5,751,882 | A |  | 5/1998 | Daems et al. |
| 5,774,337 | A |  | 6/1998 | Lee et al. |
| 5,825,616 | A |  | 10/1998 | Howard et al. |
| 5,825,962 | A |  | 10/1998 | Walters et al. |
| 5,956,449 | A |  | 9/1999 | Otani et al. |
| 6,222,908 | B1 | * | 4/2001 | Bartolutti et al. .......... 379/27.01 |
| 6,234,830 | B1 | * | 5/2001 | Ensz et al. ..................... 439/491 |
| 6,280,238 | B1 | * | 8/2001 | Baker et al. ................... 439/491 |
| 6,285,293 | B1 | * | 9/2001 | German et al. ................ 340/687 |
| 6,330,307 | B1 | * | 12/2001 | Bloch et al. ..................... 379/25 |
| 6,350,148 | B1 | * | 2/2002 | Bartolutti et al. ............. 439/489 |
| 6,424,710 | B1 | * | 7/2002 | Bartolutti et al. ............. 379/326 |
| 6,626,697 | B1 | * | 9/2003 | Martin et al. ................. 439/488 |

(Continued)

FOREIGN PATENT DOCUMENTS

WO WO 2004/021061 3/2004

OTHER PUBLICATIONS

Systimax Structured Connectivity Solutions Product Guide (2003) pp. 221,223.

(Continued)

*Primary Examiner* — Joshua Rodden
(74) *Attorney, Agent, or Firm* — Myers Bigel Sibley & Sajovec, P.A.

(57) ABSTRACT

A method of retrofitting an existing patching system with an intelligent patching module includes the steps of: providing at least one patching shelf unit populated with interconnection sites, the shelf unit including a rear face and an opposing front side; routing a cable between a rear location located rearward of the rear face and the front side; connecting the cable to the intelligent patching module; and attaching the intelligent patching module to the shelf unit.

8 Claims, 7 Drawing Sheets

(56) References Cited

U.S. PATENT DOCUMENTS

| | | | |
|---|---|---|---|
| 6,688,910 B1* | 2/2004 | Macauley | 439/491 |
| 6,802,735 B2* | 10/2004 | Pepe et al. | 439/488 |
| 6,954,354 B2 | 10/2005 | Shyr | |
| 6,969,130 B2 | 11/2005 | Newton et al. | |
| 6,976,867 B2* | 12/2005 | Navarro et al. | 439/489 |
| 7,153,142 B2* | 12/2006 | Shifris et al. | 439/49 |
| 7,534,137 B2* | 5/2009 | Caveney et al. | 439/540.1 |
| 7,854,624 B1* | 12/2010 | Pepe | 439/489 |
| 2005/0078929 A1 | 4/2005 | Iwanek | |
| 2005/0196120 A1* | 9/2005 | Colombo et al. | 385/135 |
| 2009/0075516 A1* | 3/2009 | Pepe et al. | 439/490 |
| 2010/0120264 A1* | 5/2010 | Caveney et al. | 439/49 |

OTHER PUBLICATIONS

European Search Report for application No. EP 05 00 8561 completed on Jul. 18, 2005.

\* cited by examiner

METHODS OF CONVERTING PATCHING SYSTEM TO INTELLIGENT PATCHING SYSTEM AND RELATED SHELF UNITS

RELATED APPLICATION

This application claims priority from U.S. Provisional Patent Application No. 61/158,500, filed Mar. 9, 2009, the disclosure of which is hereby incorporated herein in its entirety.

FIELD OF THE INVENTION

The present invention is directed generally to communication patching systems, and more particularly to shelf units for communication patch systems.

BACKGROUND

Common communication patching systems include multiple patching shelves mounted on two upright mounting rails. Such shelves typically include multiple patching sites for the interconnection of communication cables and patch cords. Also, each of the shelves typically includes a cover that separates the shelf from its neighboring shelves. When densely populated, the patching system has relatively little available space.

Patching systems have been developed that are "intelligent" in that they include functionality that enables the system to track the interconnections of the various cables and cords. One such system is sold by CommScope, Inc. under the trademark iPATCH®. Some existing non-intelligent systems may be retrofitted with intelligent functionality through the attachment of one or more components (see, e.g., the "iPATCH Ready Kit", available from CommScope, Inc., Hickory, N.C.). In order to connect the components of the retrofitting kit, it is typically necessary to connect the additional components to a ribbon cable or other cord or cable that extends between the rear face of the patching system and the front. In a densely populated shelf, unless current connections are disconnected, it can be very difficult to thread the ribbon cable along this path given the dearth of available space within the shelf.

SUMMARY OF THE INVENTION

As a first aspect, embodiments of the present invention are directed to a method of retrofitting an existing patching system with an intelligent patching module. The method comprises the steps of: providing at least one patching shelf unit populated with interconnection sites, the shelf unit including a rear face and an opposing front side; routing a cable between a rear location located rearward of the rear face and the front side; connecting the cable to the intelligent patching module; and attaching the intelligent patching module to the shelf unit.

In some embodiments, the cable is routed between the rear and front location by engaging the cable with an engagement structure of a shelf cover that overlies the shelf unit, then sliding the shelf cover between a retracted position and an extended position.

As a second aspect, embodiments of the invention are directed to a telecommunication patching system, comprising: a communication rack; and a patching shelf unit mounted to the communication rack. The patch shelf unit is populated with interconnection sites. The shelf unit comprises a shelf cover that is positioned above the interconnection sites, a rear face, and a front side opposite the rear face. The shelf cover includes an engagement projection, the engagement projection projecting rearwardly of the rear face of the shelf unit and configured to engage and capture a communication cable, such as a ribbon cable.

As a third aspect, embodiments of the present invention are directed to a patching shelf unit, comprising: a plurality of interconnection sites; a rear face; and a shelf cover positioned above the plurality of interconnection sites. The shelf cover includes a substantially planar body portion and an engagement projection attached to the rear edge of the body portion that projects rearwardly of the rear face.

DETAILED DESCRIPTION

Figure 1:
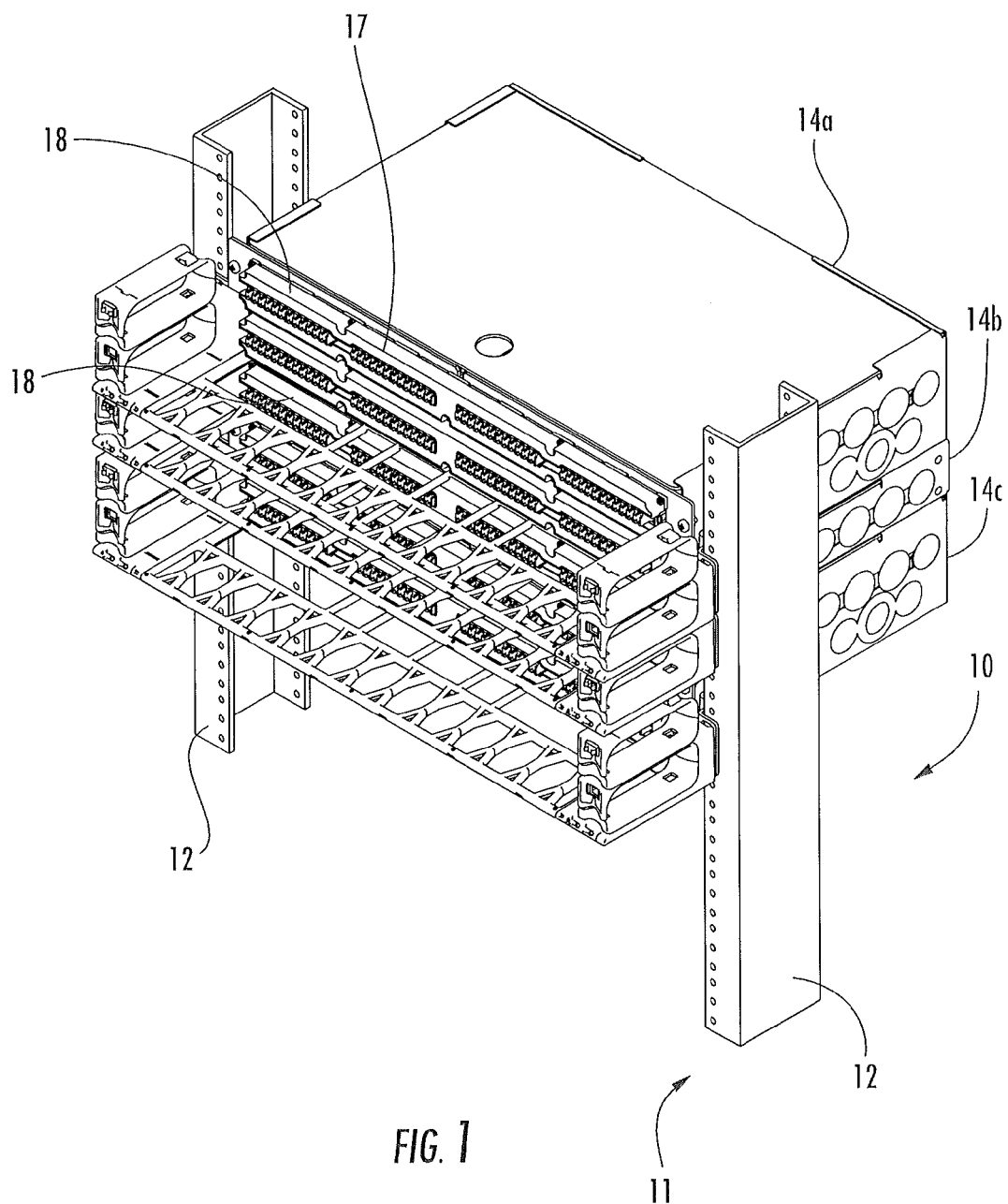
FIG. 1 is a perspective view of a patching system with a conversion kit according to embodiments of the present invention, with shelves containing patching sites mounted on mounting rails.

The present invention will be described more particularly hereinafter with reference to the accompanying drawings. The invention is not intended to be limited to the illustrated embodiments; rather, these embodiments are intended to fully and completely disclose the invention to those skilled in this art. In the drawings, like numbers refer to like elements throughout. Thicknesses and dimensions of some components may be exaggerated for clarity.

Well-known functions or constructions may not be described in detail for brevity and/or clarity.

Unless otherwise defined, all technical and scientific terms used herein have the same meaning as commonly understood by one of ordinary skill in the art to which this invention belongs. The terminology used in the description of the invention herein is for the purpose of describing particular embodiments only and is not intended to be limiting of the invention. As used in the description of the invention and the appended claims, the singular forms "a", "an" and "the" are intended to include the plural forms as well, unless the context clearly indicates otherwise. As used herein, the term "and/or" includes any and all combinations of one or more of the associated listed items. Where used, the terms "attached", "connected", "interconnected", "contacting", "coupled", "mounted," "overlying" and the like can mean either direct or indirect attachment or contact between elements, unless stated otherwise.

The sequence of operations (or steps) is not limited to the order presented in the claims or figures unless specifically indicated otherwise.

Referring now to the figures, a communication patching system, designated broadly at 10, is shown in FIG. 1. The system 10 includes a rack 11 having a pair of uprights 12 on which are mounted three patching shelf units 14a, 14b, 14c. Each of the shelf units 14a, 14b, 14c includes a floor 16 and a rear face 19 (see FIG. 3). Each shelf unit 14a, 14b, 14c also has a plurality of patching or interconnection sites 18 (in the illustrated embodiment, the patching sites 18 are provided by a patch panel 17 mounted to the front of the shelf unit 14b; however, in other embodiments, the patching sites 18 may take other forms. Those skilled in this art will also recognize that a communication cabinet may be used in place of the rack 11; the terms "rack" and "cabinet" are intended to be interchangeable as used herein.

Figure 2:
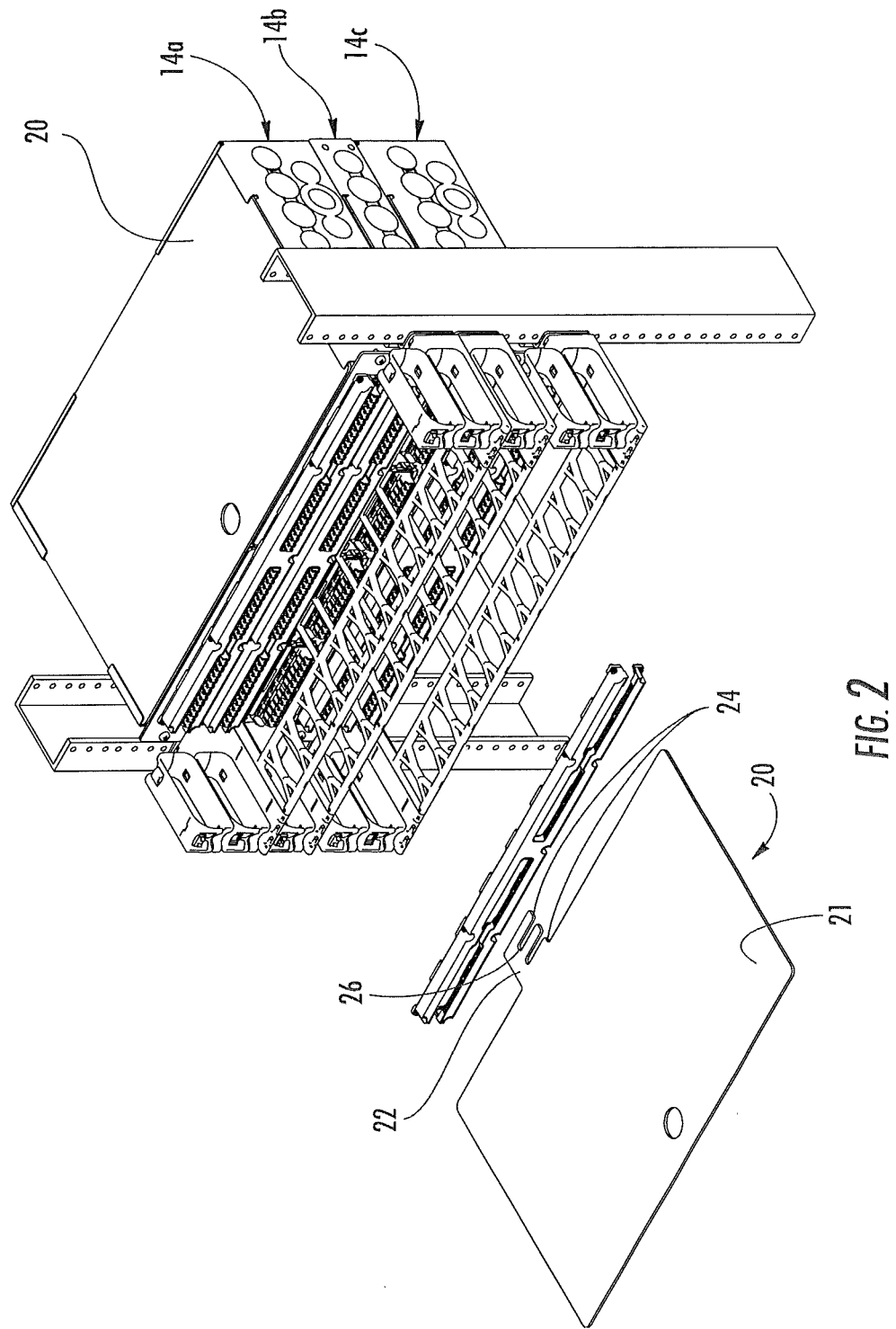
FIG. 2 is an exploded perspective view of the patch system of FIG. 1.
Figure 3:
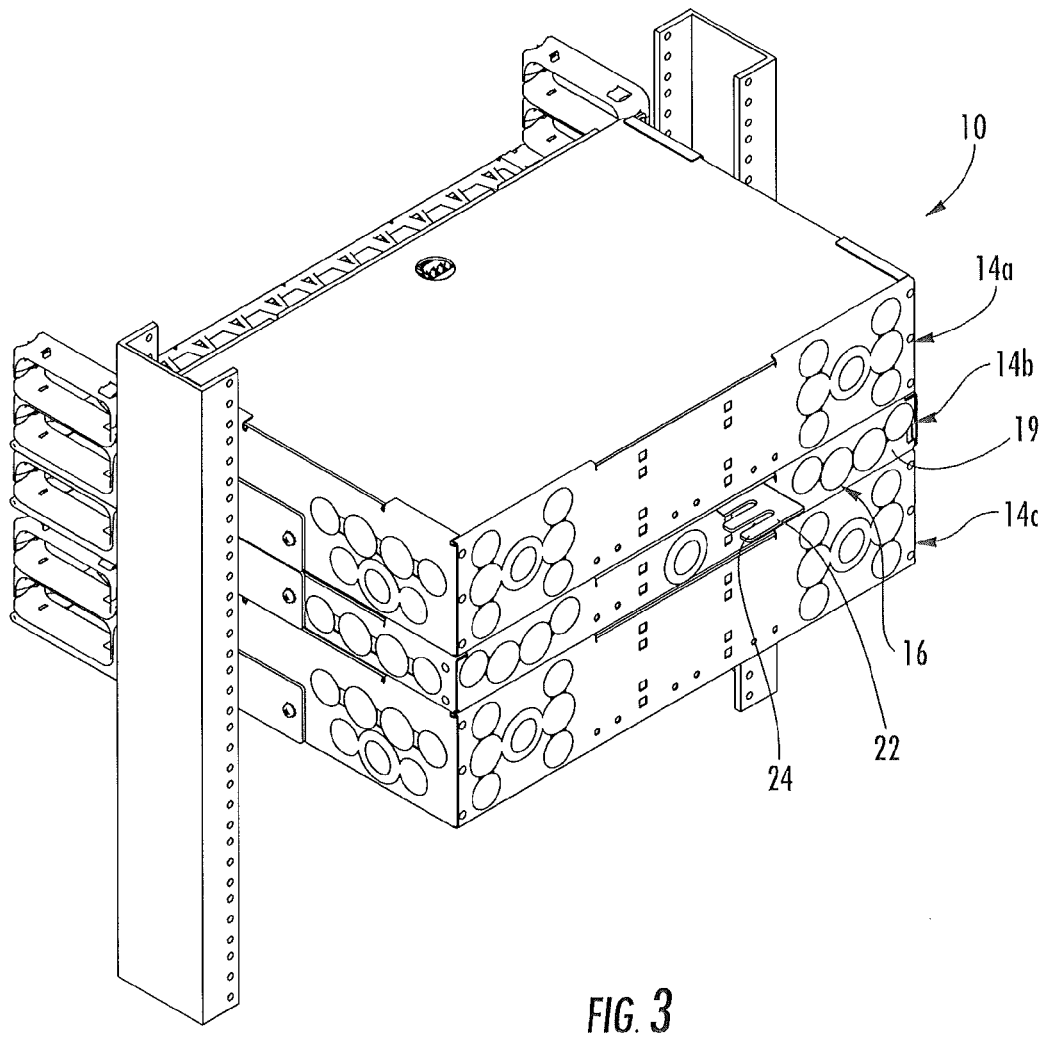
FIG. 3 is a rear perspective view of the patching system of FIG. 1 with the shelf cover in a retracted position such that the hook extends beyond the rear face of the patching system.

Referring now to FIG. 2, each of the shelf units 14a, 14b, 14c has a substantially planar cover 20 that is positioned atop the shelf unit and separates a lower shelf unit from the shelf unit positioned immediately above (e.g., shelf cover 20 separates shelf unit 14b from shelf unit 14a). The shelf cover 20 is positioned above the interconnection sites 18. As can be seen in FIG. 2, the shelf cover 20 of the shelf unit 14b has a hook 22 that projects rearwardly from the rear edge of the body portion 21 of the cover 20 for shelf unit 14b. The hook 22 has two tines 24 that are substantially coplanar with the remainder of the cover 20; the tines 24 are separated from each other and from the remainder of the cover 20 by gaps 26. The tines 24 and gaps 26 are arranged to engage and capture a ribbon cable 32 (see FIG. 4). As shown in FIG. 3, when the cover 20 is in place, the hook 22 projects rearwardly beyond the rear face 19 of the shelf unit 14b.

Figure 4:
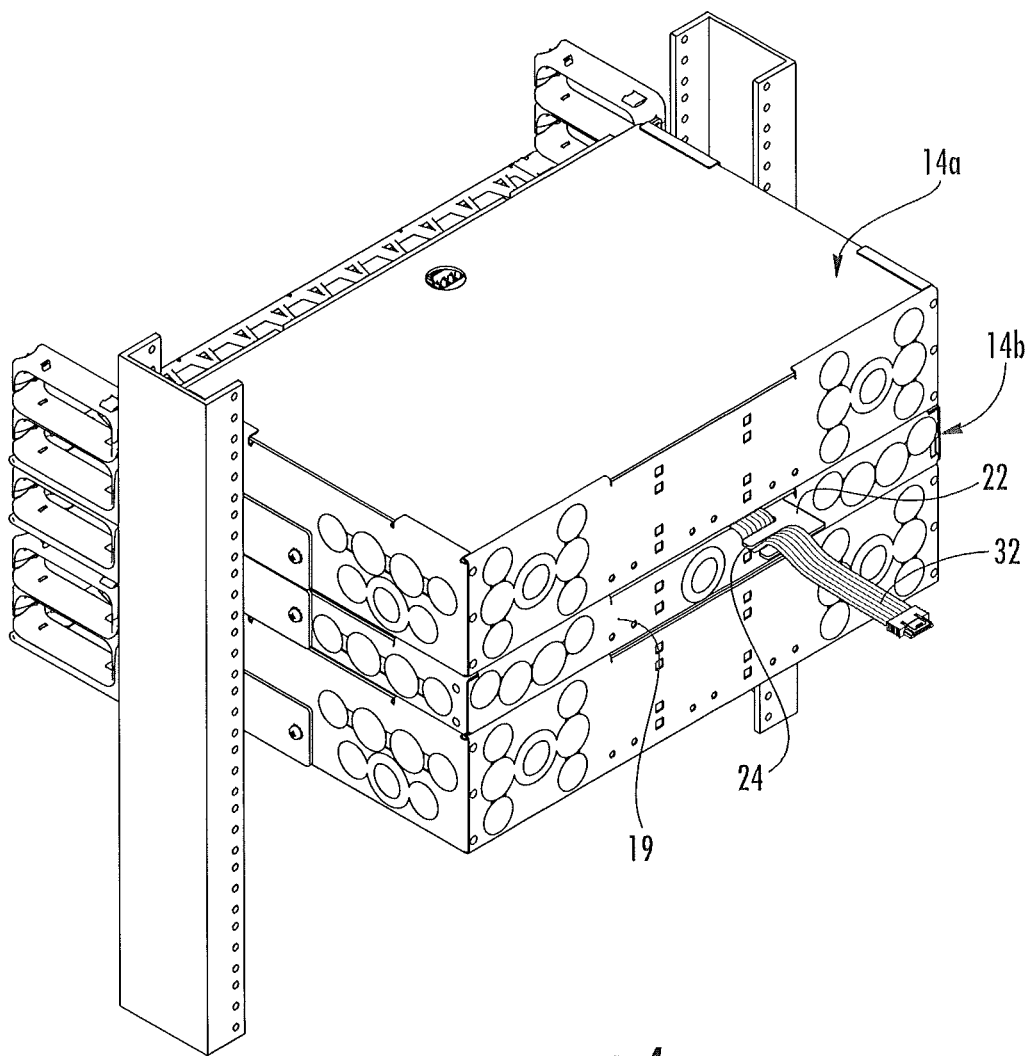
FIG. 4 is a rear perspective view of the patching system of FIG. 1 with the shelf cover in a retracted position and a ribbon cable engaged and captured by the hook in the cover.
Figure 5:
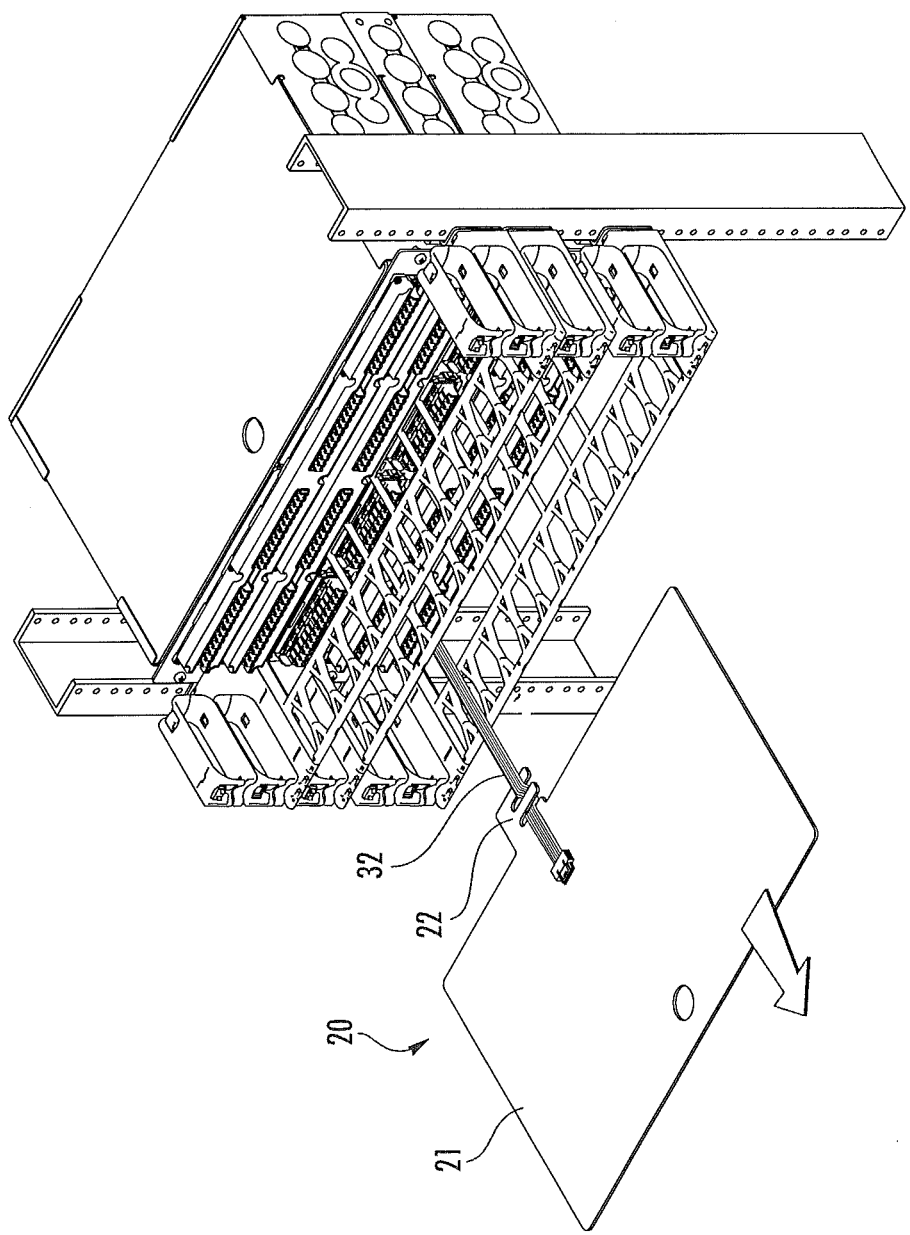
FIG. 5 is a perspective view of the patching system of FIG. 1 with the shelf cover of the conversion kit in or beyond an extended position in which the captured ribbon cable has been drawn through the shelf unit.
Figure 6:
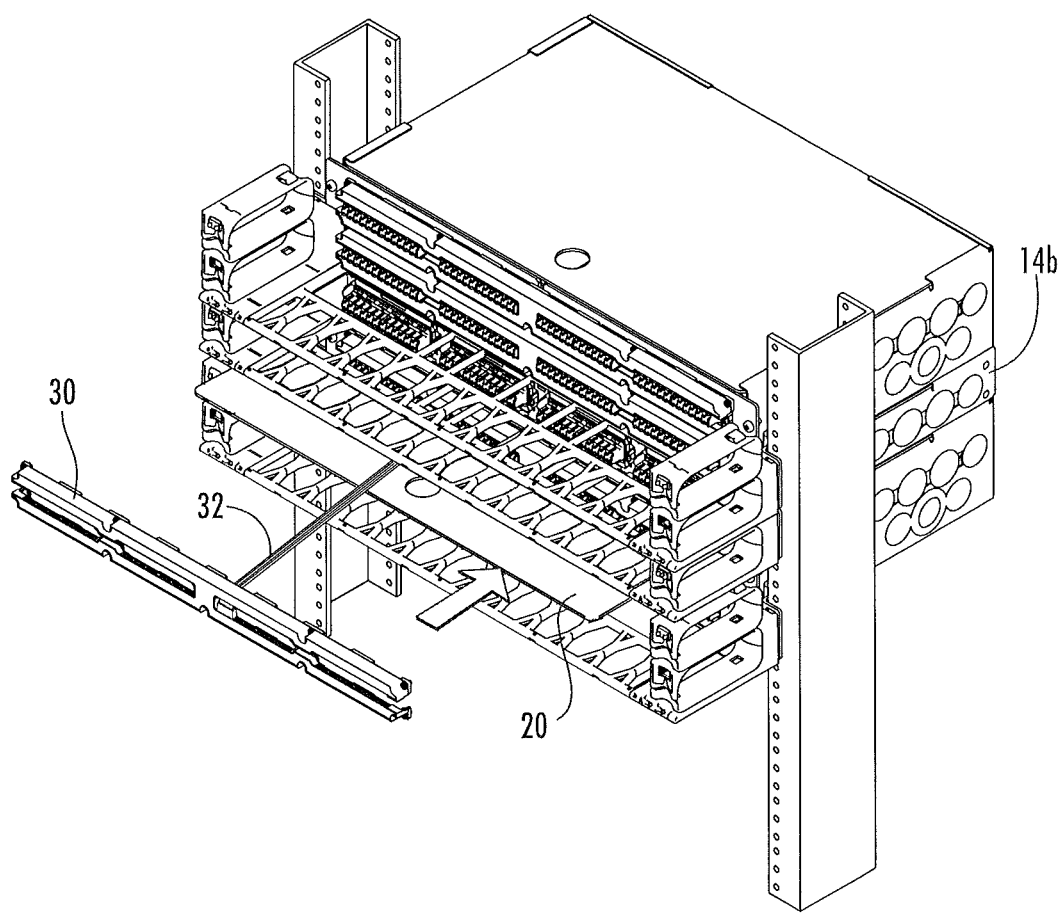
FIG. 6 is a perspective view of the patching system of FIG. 1 showing the attachment of the ribbon cable to an intelligent patching module.
Figure 7:
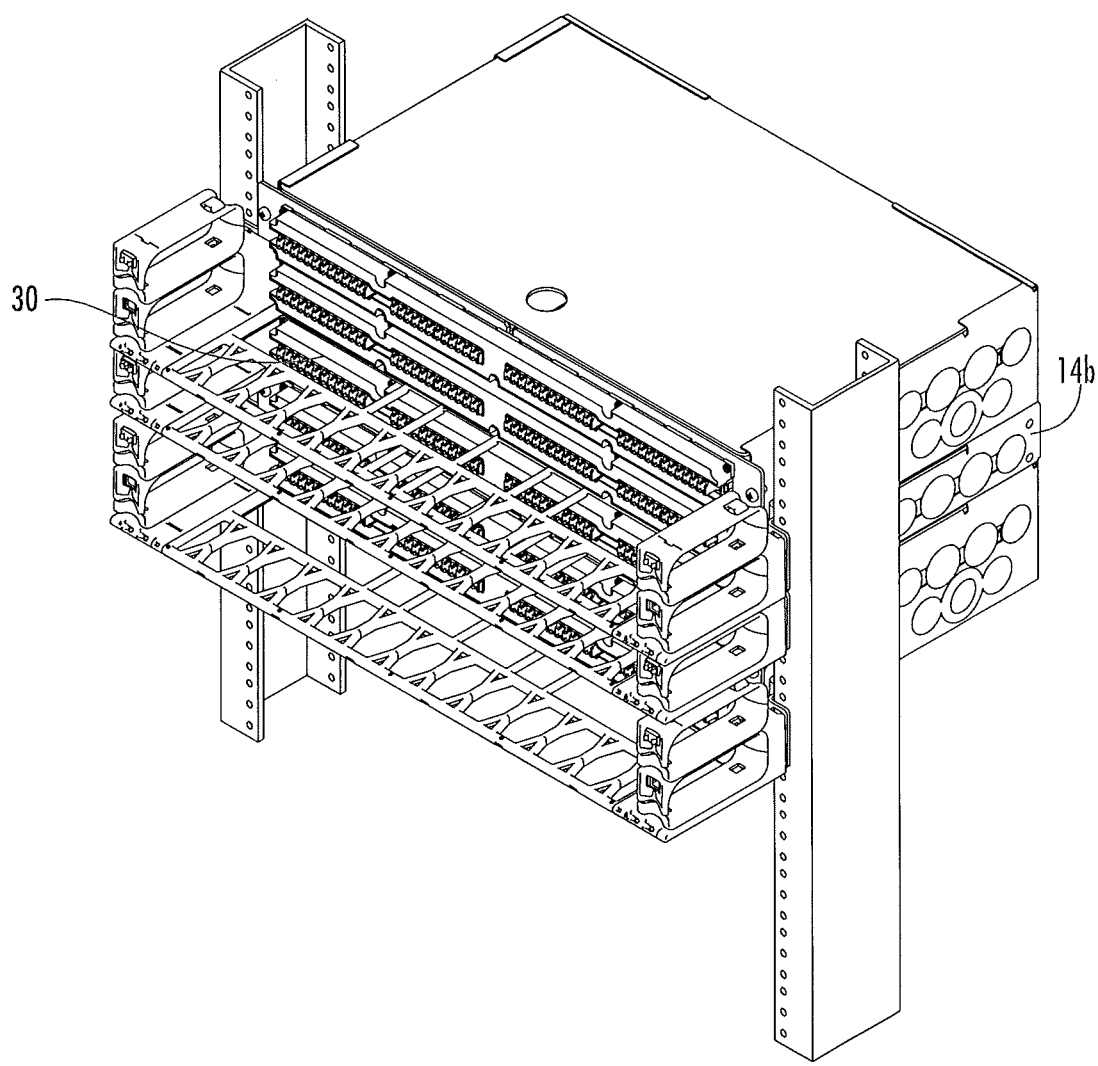
FIG. 7 is a perspective view of the patching system of FIG. 1 with the intelligent patching module mounted to the front of the shelf unit.

The shelf cover 20 can be employed in either of two ways. In one technique, the cover 20 is first inserted into the shelf unit 14b in the retracted position of FIG. 3 and the ribbon cable 32 is engaged on the hook 22 by threading the ribbon cable 32 through the tines 24 of the hook 22 (FIG. 4). Subsequent sliding of the cover 20 forwardly to a forward extended position (as shown in FIG. 5) has the effect of drawing the engaged end of the ribbon cable 32 from a location rearward of the rear face 19 through the shelf cavity, even when the shelf 14b is densely populated. The end of the ribbon cable 32 can then be grasped by a technician forward of the rear face 19 and connected to an intelligent patching module 30 (FIG. 6) that is then mounted onto the front of the shelf unit 14b (FIG. 7). Exemplary intelligent patching modules include the SYSTIMAX 360™ iPatch® Panel Manager; the iPatch® Rack Manager Plus; and the SYSTIMAX 360™ iPatch® 1100GS3 Panel, each of which is available from CommScope, Inc., Hickory, N.C.

In the second technique, the cover 20 can be removed by sliding it forwardly of the extended position of FIG. 5. One end of the ribbon cable 32 is engaged on the hook 22, and the cover 20 is re-inserted into the shelf unit 14b and slid into the retracted position of FIG. 4. Doing so threads the engaged end of the ribbon cable 32 through the densely populated shelf unit 14b.

With either technique, upon completion the ribbon cable 32 is routed from the back face of the shelf unit 14b to the front of the shelf unit 14b, where it can be connected with an intelligent patching module 30. Such routing can be accomplished without the disconnection of numerous connections on the shelf unit 14b.

Notably, during the routing of the ribbon cable 32, the ribbon cable 32 may rest on the upper surface of the cover 20. This position can be advantageous in that it prevents contact and possible snagging between the ribbon cable 32 and connections already present in the shelf unit 14b, which snagging could disconnect the connections or otherwise harm these components.

Those skilled in this art will appreciate that engagement structures on the cover 20 for engaging the ribbon cable 32, such as hooks of different configurations, pincers, eyelets, T-bars and other extensions, and the like may be also be employed in place of the hook 22. In addition, other techniques for connecting the intelligent patching components, including routing the cable differently (e.g., over the cover 20 or within a channel formed in the cover 20) may also be employed.

The foregoing is illustrative of the present invention and is not to be construed as limiting thereof. Although exemplary embodiments of this invention have been described, those skilled in the art will readily appreciate that many modifications are possible in the exemplary embodiments without materially departing from the novel teachings and advantages of this invention. Accordingly, all such modifications are intended to be included within the scope of this invention.

That which is claimed is:

1. A method of retrofitting an existing patching system with an intelligent patching module, comprising the steps of:
providing an existing patching system including at least one patching shelf unit populated with interconnection sites, the shelf unit including a rear face and an opposing front side;
routing a cable between a rear location located rearward of the rear face and the front side;
connecting the cable to an intelligent patching module; and attaching the intelligent patching module to the shelf unit;
wherein the shelf unit includes a shelf cover that overlies the interconnection sites, and wherein the step of routing comprises attaching the cable to the shelf cover and sliding the shelf cover between a rearward retracted position and a forward extended position.

2. The method defined in claim 1, wherein the shelf cover includes an engagement projection configured to engage the cable during the step of sliding.

3. The method defined in claim 1, wherein routing the cable comprises routing the cable as a portion of the cable rests on an upper surface of the shelf cover.

4. The method defined in claim 1, wherein the step of sliding comprises sliding the shelf cover from the retracted position to the extended position.

5. The method defined in claim 1, wherein the step of sliding comprises sliding the shelf cover from the extended position to the retracted position.

6. The method defined in claim 2, wherein the engagement projection projects rearwardly from the rear face of the shelf unit when the shelf cover is in the retracted position.

7. The method defined in claim 2, wherein the engagement member is a hook that is substantially coplanar with a body portion of the shelf cover.

8. The method defined in claim 1, wherein the cable is a ribbon cable.

* * * * *